(12) United States Patent
Frank et al.

(10) Patent No.: US 8,389,157 B2
(45) Date of Patent: Mar. 5, 2013

(54) ORIENTED NANOTUBE ELECTRODES FOR LITHIUM ION BATTERIES AND SUPERCAPACITORS

(75) Inventors: Arthur J. Frank, Golden, CO (US); Kai Zhu, Golden, CO (US); Qing Wang, Singapore (SG)

(73) Assignee: Alliance for Sustainable Energy, LLC, Golden, CO (US)

(*) Notice: Subject to any disclaimer, the term of this patent is extended or adjusted under 35 U.S.C. 154(b) by 842 days.

(21) Appl. No.: 12/389,895

(22) Filed: Feb. 20, 2009

(65) Prior Publication Data

US 2009/0214942 A1  Aug. 27, 2009

Related U.S. Application Data

(60) Provisional application No. 61/030,673, filed on Feb. 22, 2008.

(51) Int. Cl.
*H01M 4/48* (2010.01)
*H01M 4/139* (2010.01)
*H01G 9/058* (2006.01)

(52) U.S. Cl. ....... 429/209; 429/231.5; 205/57; 205/538; 361/502

(58) Field of Classification Search ............... 429/231.5, 429/223, 224, 209; 205/57, 66, 538, 539, 205/543; 361/502
See application file for complete search history.

(56) References Cited

U.S. PATENT DOCUMENTS

| 6,316,145 B1 * | 11/2001 | Kida et al. ............... 429/231.5 |
| 6,454,816 B1 | 9/2002 | Lee et al. |
| 6,653,022 B2 | 11/2003 | Nordlinder et al. |
| 7,061,749 B2 | 6/2006 | Liu et al. |
| 7,116,546 B2 | 10/2006 | Chow et al. |
| 7,149,076 B2 | 12/2006 | Yuan et al. |
| 7,189,430 B2 | 3/2007 | Ajayan et al. |
| 2006/0125033 A1 | 6/2006 | Segal et al. |
| 2006/0279905 A1 | 12/2006 | Chow et al. |
| 2007/0218202 A1 | 9/2007 | Ajayan et al. |
| 2007/0242417 A1 | 10/2007 | Mosley et al. |
| 2007/0279837 A1 | 12/2007 | Chow et al. |
| 2008/0068776 A1 | 3/2008 | Tsai et al. |
| 2008/0107892 A1 | 5/2008 | Jiao et al. |

OTHER PUBLICATIONS

Zhu, "Enhanced Charge-Collection Efficiencies and Light Scattering in Dye-Sensitized Solar Cells Using Oriented TiO2 Nanotubes Arrays", Non Lett., 7 (1), 69-74, 2007, (Dec. 2006).

Zhu, "Oriented TiO2 Nanotube Arrays for Dye-Sensitized Solar Cells: Effect of Nanostructure Order on Transport, Recombination, and Light Harvesting", DOE/EERE Solar Program Annual Review, Apr. 17-19, 2007.

Ouyang, "High Photoconductive Vertically Oriented TiO2 Nanotube Arrays and Their Composites with Copper Phthalocyanine" J. Phys. Chem. C, 112 (7), 2343-2348, Jan. 2008.

Albu, "Self-Organized, Free-Standing TiO2 Nanotube Membrane for Flow-Through Photocatalytic Application", Nano Lett., 7 (5), 1286-1289, Apr. 2007.

Yoriya, "Fabrication of Vertically Oriented TiO2 Nanotube Arrays Using Dimethyl Sulfoxide Electrolytes", J. Phys. Chem. C., 111 (37), 13771-13776, Aug. 2007.

(Continued)

*Primary Examiner* — Stephen J. Kalafut
(74) *Attorney, Agent, or Firm* — Paul J. White; John C. Stoips

(57) ABSTRACT

An electrode having an oriented array of multiple nanotubes is disclosed. Individual nanotubes have a lengthwise inner pore defined by interior tube walls which extends at least partially through the length of the nanotube. The nanotubes of the array may be oriented according to any identifiable pattern. Also disclosed is a device featuring an electrode and methods of fabrication.

17 Claims, 10 Drawing Sheets

OTHER PUBLICATIONS

Liu, "TiO2 Nanotube Arrays Annealed in N2 for Efficient Lithium-Ion Intercalation", J. Phys. Chem. C, 112, 11175-11180, (Jul. 2008).

Zhu, "Removing Structural Disorder from Oriented TiO2 Nanotube Arrays: Reducing the Dimensionality of Transport and Recombination in Dye-Sensitized Solar Cells", Nano Letters, vol. 7, No. 12, 3739-3746, Jun. 2007.

Ortiz, "Alternative Li-Ion Battery Electrode Based on Self-Organized Titania Nanotubes", Chem. of Mater., vol. 21, No. 1, 2009, (Dec. 2008).

Guo et al., "Superior Electrode Performance of Nanostructured Mesoporous TiO2 (Anatase) through Efficient Hierarchical Mixed Conducting Networks", Advanced Materials, 2007, vol. 19, pp. 2087-2091.

Liu et al., "Lithium Intercalation Capacity of Mesoporous Titania Nanotube Arrays with Nitrogen Annealing Treatment", (Abstract R4.3) Materials Research Society, Symposium R: Life Cycle Analysis for New Energy Conversion and Storage Systems, 2007, http://www.mrs.org/f07-abstract-r/, accessed Sep. 25, 2012, p. 9.

* cited by examiner

ORIENTED NANOTUBE ELECTRODES FOR LITHIUM ION BATTERIES AND SUPERCAPACITORS

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

BACKGROUND

The development of high-power, high-energy, long-life, and low-cost rechargeable batteries is critical for the next-generation electric and hybrid electric vehicles. Among various battery technologies, lithium-ion (or Li-ion) batteries are promising energy storage devices as a result of the high energy densities, low self-discharges, and long cycle lives of known Li-ion batteries.

Three basic functional elements support the electrochemical reactions in a lithium ion battery. These elements are anode, cathode, and electrolyte. Both the anode and cathode are materials into which and from which lithium ions can migrate. The process of lithium moving into the anode or cathode is referred to as insertion (or intercalation), and the reverse process, in which lithium moves out of the anode or cathode is referred to as extraction (or deintercalation). When a cell is discharging, the lithium ions are extracted from the anode and inserted into the cathode. When the cell is charging, the reverse process occurs: lithium ions are extracted from the cathode and inserted into the anode.

The negative electrode during discharge (the anode) of a conventional and commercially available Li-ion cell has typically been made from graphite. The positive electrode during discharge (the cathode) is conventionally made of a metal oxide such as $LiCoO_2$. The electrolyte is typically a lithium salt in an organic solvent, for example, $LiPF_6$ dissolved in ethylene carbonate/diethyl carbonate.

The Li ion insertion and extraction processes at the electrodes in a Li-ion battery are typically described by the following reaction:

$$xLi^+ + xe^- + M \leftrightarrow Li_xM \quad (1)$$

where M represents the electrode material. Despite the commercial success of Li-ion batteries to date, the performance of microstructured electrodes, such as graphite, is limited by several factors, including but not limited to: slow charge/discharge rates resulting from long lithium diffusion lengths in the electrode materials; structural instability induced by crystal lattice strain arising from lithium insertion/extraction processes; and irreversible Li ion capacity loss owing, in part, to structure instability.

Advances have been made in the fields of nanoscience and nanotechnology which allow for the nanoscale structuring of Li-ion electrode materials. Compared with conventional microstructured electrode materials, the small structural elements of nanostructured electrodes can result in much shorter solid-state lithium diffusion lengths (shorter Li-insertion distances), leading to faster charge and discharge rates and, therefore, higher power densities. Also, nanostructured materials can sustain a higher degree of strain during the lithium insertion/extraction processes, permitting a larger number of charge and discharge cycles with improved capacity-retention capability. The large electrode/electrolyte contact area of certain nanostructured electrodes reduces the interfacial Li insertion/extraction current density, enabling further improvements in the rate capability of a battery. Newly observed Li ion storage mechanisms, which are relatively unimportant in bulk or microstructured electrodes, become substantive on the nanoscale. For example, in addition to the normal Li ion storage mechanism of the bulk material, a large surface capacitive effect associated with nanomaterials, such as nanostructured oxides, can substantially increase Li ion storage capability.

Known nanostructured electrodes feature inherently disordered or randomly-packed materials, such as randomly grown or applied nanoparticles, nanowires, or nanotubes. Although certain advantages exist with nanostructured electrode materials, the disordered or random packing of known nanostructures generally leads to limiting operational characteristics, including but not limited to: convoluted and relatively long electron/ion conducting pathways; losses of surface area owing to agglomerations; and low-packing densities in the case of non-oriented nanowires, or nanotubes. These structure-related issues limit the power and energy densities achievable with a battery or other device using randomly packed nanoscale electrode materials.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One embodiment is an electrode having an oriented array of multiple nanotubes. The nanotubes may be of any material including, but not limited to, a metal or metal oxide. Individual nanotubes have a lengthwise inner pore defined by interior tube walls which extends at least partially through the length of the nanotube. The nanotubes of the array may be oriented according to any identifiable pattern. For example, individual nanotubes may be associated at one end with a current collecting substrate. Alternatively, individual nanotubes may be oriented substantially normal to the surface of a current collecting substrate. Alternatively, individual nanotubes may be otherwise arranged or formed according to an identifiable and non-random pattern.

Another embodiment is a device including at least one electrode as described above. The device may also include one or more other electrodes which may or may not include an oriented array of nanotubes. The device includes an electrolyte in electrochemical communication with each electrode. The device may be, but is not limited to, a battery, supercapacitor, or other device which utilizes an electrode.

A further embodiment is a method of fabricating an electrode. The method includes providing a metal surface and electrochemically anodizing the metal surface to form thereon an array of nanotubes having lengthwise inner pores associated with the substrate at one end. The nanotubes may extend normal to the metal surface. The method may further include annealing or otherwise post-growth processing the array of nanotubes to modify and selectively achieve desired nanotube and electrode physical or chemical parameters.

In addition to the exemplary aspects and embodiments described above, further aspects and embodiments will become apparent by reference to the drawings, claims and by study of the following descriptions.

BRIEF DESCRIPTION OF THE DETAILED DRAWINGS

FIG. 10a is a cyclic voltammogram showing the performance of an exemplary Li ion battery featuring an electrode having an array of metal oxide nanotubes.

FIG. 10b is a graph showing the peak discharge current of the exemplary Li ion battery of FIG. 10a.

DETAILED DESCRIPTION

Figure 1:
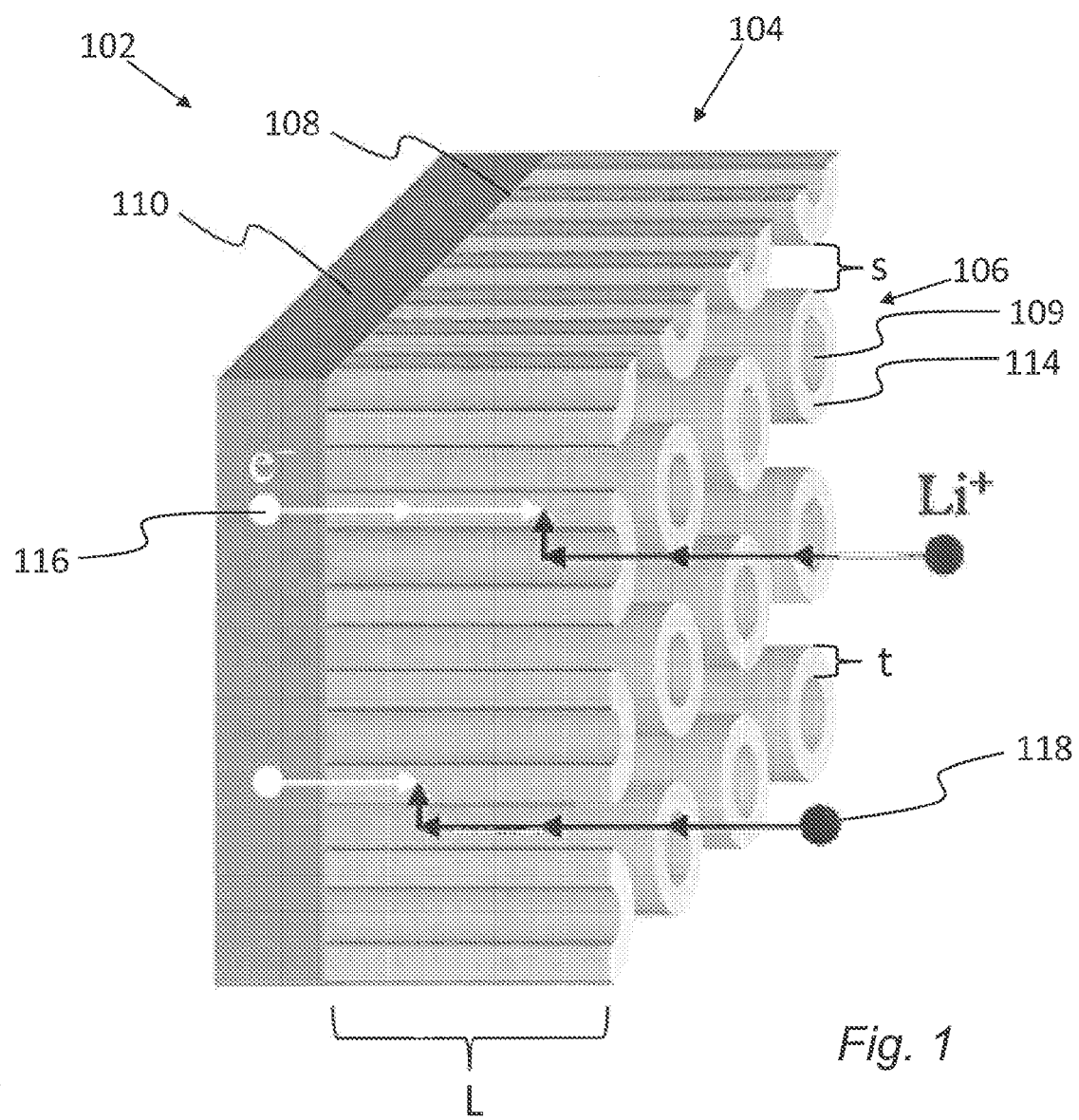
FIG. 1 is a schematic illustration of an exemplary electrode featuring an oriented array of multiple nanotubes.

An exemplary embodiment is an electrode 102 as schematically illustrated in FIG. 1. The electrode 102 includes an array 104 of multiple individual nanotubes 106. As used herein, a nanotube (NT) is a hollow tube having a width generally perpendicular to the tube length which is less than 1,000 μm. Typically, nanotubes have a length of much less than 1,000 μm, for example, less than 200 μm.

The nanotubes 106 of the array 104 may be grown, formed, deposited or otherwise fabricated from any type of suitable material. Representative nanotube materials include, but are not limited to metal oxides such as $TiO_2$, $Fe_2O_3$, $Nb_2O_5$, $CoO_2$, $MnO_2$ and $MoO_3$, and the like. A metal oxide may be present in a nanotube in an amorphous state, in a crystalline state, or in a mixed state. The metal oxide nanotube may have separate crystalline and amorphous portions. For example, the crystalline structures of a $TiO_2$ nanotube array may be of any known crystalline phase including, but not limited to, anatase, rutile, brookite or other crystalline polymorphs, and the like. Alternatively, the nanotubes 106 of an array 104 may be fabricated of metals or other suitable materials.

In the various embodiments disclosed herein, the individual nanotubes 106 of the array 104 are oriented with respect to each other. As used herein, the word "oriented" means that individual nanotubes are arranged or formed with respect to each other according to an identifiable pattern. Any identifiable pattern or oriented arrangement of nanotubes is within the scope of this disclosure. Thus, an oriented array 104 may be distinguished from a randomly packed or disoriented array of nanotubes where individual nanotubes are arranged by chance and exhibit no identifiable pattern with respect to other nanotubes in the randomly packed collection. For example, in the embodiment of FIG. 1, one end 108 of each nanotube is associated with a current collecting substrate 110. The opposite end of each nanotube 106 in the array is free and extends away from the current collecting substrate 110. The configuration where one end of each nanotube in an array is associated with a substrate is an orientation as defined herein, and the collection of nanotubes is thus an oriented array 104.

In the embodiment of FIG. 1, the individual nanotubes 106 of the array 104 are also oriented approximately normal to the surface of the current collecting substrate 110 where the nanotube is associated with the surface. Accordingly, in FIG. 1, individual nanotubes are substantially parallel to adjacent nanotubes since the current collecting substrate is substantially planar. The configuration of the nanotubes of the array 104, such that individual nanotubes are approximately normal to the surface of the current collecting substrate 110 and/or substantially parallel to each other, are additional indicia demonstrating that the FIG. 1 embodiment is an "oriented" array. This array would, however, still be considered to be oriented even if the nanotubes were not substantially normal to the surface of the substrate or not substantially parallel to adjacent tubes.

Although the current collecting substrate 110 is shown as a substantially planar element in FIG. 1, this configuration is not limiting upon the scope of the electrode 102. For example, a substrate may be formed into any number of curved or folded surfaces, for example a lengthwise coil. In such a configuration the individual nanotubes may be oriented by having one end of each nanotube associated with the substrate and the other end extending away from the substrate as described above. Because the substrate is curved or folded however, the nanotubes may or may not be approximately normal to the surface of the substrate where the nanotube is associated with the surface, and may or may not be parallel to adjacent nanotubes.

The current collecting substrate 110 may be formed, deposited or otherwise fabricated from any suitable metal, metal oxide, conducting silicate or glass or other conductor. For example, Ti (or the like) may be used as a suitable current collecting substrate 110 although the electrode 104 is not limited to embodiments having a Ti current collecting substrate.

Each individual nanotube 106 will have an inner pore 109 defined by interior tube walls 114. The pore 109 may extend wholly or partially lengthwise through a given nanotube 106 along length L. The tube wall 114 of a selected nanotube will have an average tube thickness "t." In addition, a spacing "s" between the exterior tube walls of adjacent nanotubes 106 may be measured which is dependent upon the relative sizes and density of the nanotubes 106 included in the array 104.

The array of nanotubes included in the electrode 102 may be fabricated to have an average pore diameter of between about 2 nm and 300 nm using known technology. As discussed in detail below, arrays have been fabricated having an average inner pore diameter of between 21.2 nm and 96.2 nm.

In addition, an array may be fabricated using known methods where the spacing "s" between adjacent nanotubes may be of about 0 to 100 nm. As discussed in detail below, arrays have been fabricated having a spacing between nanotubes of 4.8 nm to 8.8 nm. The wall thickness "t" of selected nanotubes may also be fabricated to be between about 2 nm to 100 nm. As discussed in detail below, arrays have been fabricated with a wall thickness of between 9.6 nm and 17.5 nm. The array may include nanotubes 106 having a length "L" of between about 0.2 µm to about 1000 µm. As described in detail below, arrays have been fabricated having an average nanotube length of between about 0.6 µm and 3.8 µm.

An electrode 102 as shown on FIG. 1 featuring an array 104 of oriented nanotubes will physically define direct conducting pathways for electrons and ions and will have high nanostructure packing densities and exhibit large accessible surface areas. Accordingly, an electrode as described above is well-suited for use in a battery, supercapacitor, or other electronic device. One representative, but non-exclusive electronic device which is well-suited for implementation with an electrode 102 is a lithium ion battery. For example, $TiO_2$ may be used to fabricate an electrode 102 as will be described in detail below. $TiO_2$ has high rate capability, good capacity retention, low cost, and low toxicity. Moreover, because of the relatively positive Li insertion/extraction potential of $TiO_2$ electrodes, such electrodes are virtually free of lithium plating and surface decomposition reactions with an electrolyte. Thus, $TiO_2$ electrodes are both effective and relatively safe. Of course other electrodes may also be used.

An electrode featuring an oriented array 104 as described above features higher packing densities than an electrode having a random or disoriented assembly of nanostructures. For example, the packing density (weight of electrode materials per volume of electrode materials) of an oriented array 104 may be 3 or 4 times higher than that shown by randomly packed nanotube films. Similarly, the approximately parallel arrangement of pores 109 between adjacent nanotubes, along with the three-dimensional arrangement of spaces between adjacent nanotubes should provide direct conducting pathways for both electrons and ions as indicated on FIG. 1 and in more detail on FIG. 2 where representative electrons 116 are schematically illustrated as traveling within the metal oxide tube walls and representative ions 118 are shown traveling within an electrolyte filling the tube pores and spaces between tubes respectively.

Figure 2:
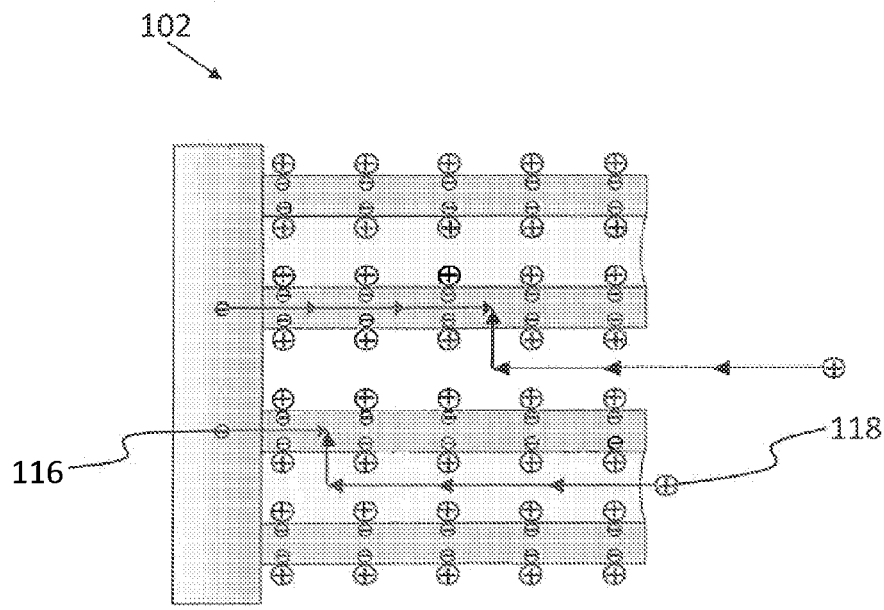
FIG. 2 is the electrode of FIG. 1 with a schematic illustration of exemplary electron and ion interactions therein.

It may be noted from FIGS. 1 and 2 that both the interior and exterior walls of nanotubes are accessible to ions in the electrolyte and that said ions can be stored either close to the surface or inside a nanotube wall. The oriented nanotube architecture described herein, which facilitates direct conducting pathways for electrons and ions, thus improves the achievable power density of a device, such as a battery or capacitor without requiring any conducting additive substances. In addition, the high nanoscale packing densities of an oriented array facilitates high energy density. Furthermore, the large accessible surface areas associated with the oriented nanotube structure also further contributes to high energy and power densities.

Figure 3:
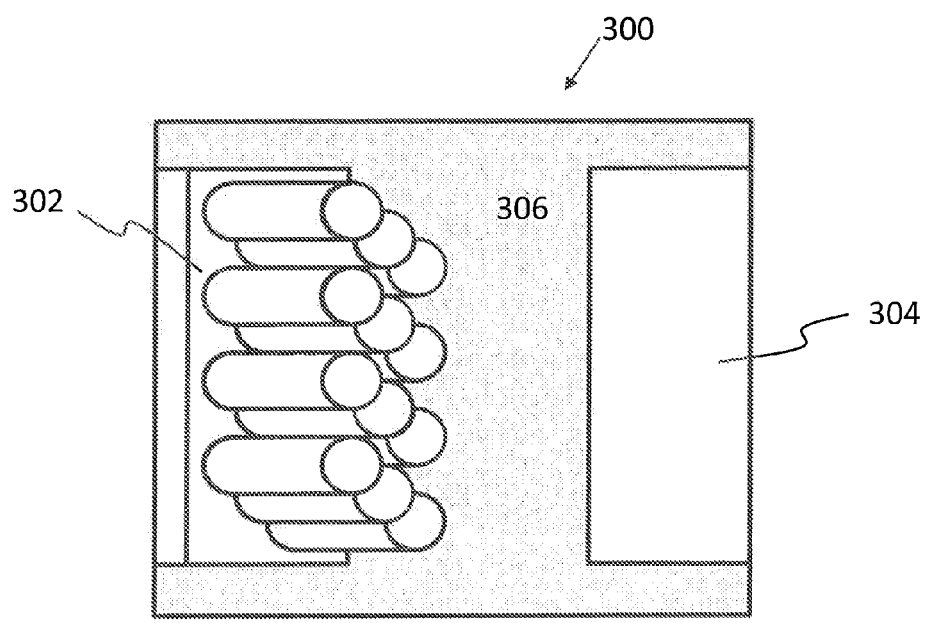
FIG. 3 is a schematic representation of an exemplary device featuring at least one electrode having an oriented array of nanotubes.

Another embodiment disclosed herein is a device 300 as schematically represented in FIG. 3. The device 300 includes an electrode 302 which features an oriented array of nanotubes as described in detail herein. Representative devices include, but are not limited to, batteries, supercapacitors, or other devices and other apparatus which utilize an electrode to facilitate electrochemical functionality. A representative device 300 as shown in FIG. 3 will typically include at least two electrodes with one electrode being customarily identified as the anode and the other electrode identified as a cathode. The electrode 302 which features an array of oriented nanotubes may be either an anode or cathode depending upon the specific parameters of the device implementation. The second electrode 304 may or may not include an oriented array of nanotubes. In embodiments where the device 300 is a battery, capacitor or hybrid device, the space between and within the electrodes 302, 304 is typically filled with an electrolyte containing ions. As used herein, the electrodes 302, 304 of a selected device may be identified as the anode and cathode or, alternatively, as the first electrode and second electrode or alternatively as the working electrode and counter electrode to avoid the confusion inherent with traditional anode and cathode nomenclature. The device 300 is not limited to embodiments featuring only two electrodes. A particular device may have any number of electrodes, one or more of which feature oriented arrays of nanotubes.

Figure 4:
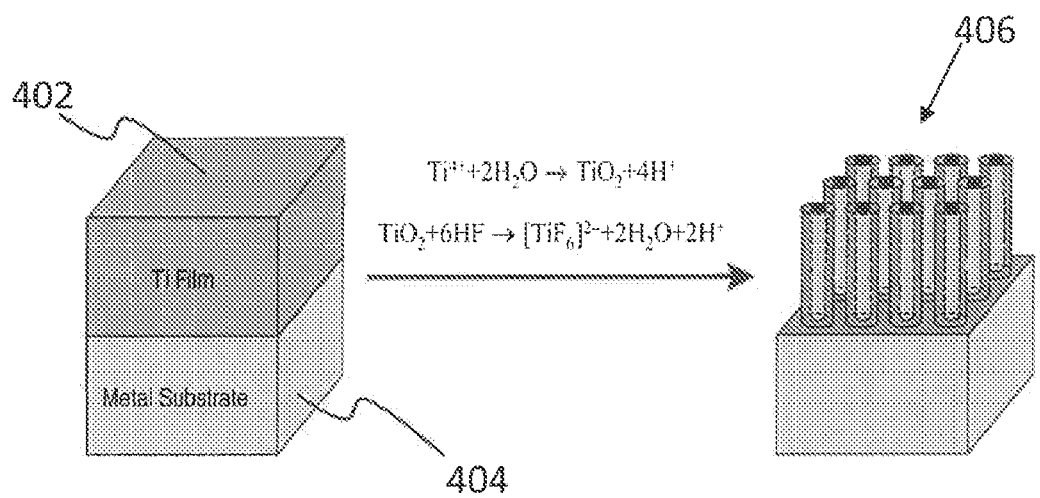
FIG. 4 is a schematic representation of an exemplary method of fabricating an electrode having an oriented array of nanotubes.

An electrode 102 as shown on FIG. 1 may be fabricated using any known method. For example, an oriented nanotube electrode 102 may be formed by template-assisted growth or deposition synthesis. Alternatively, cost savings may be achieved by template-free synthesis of the nanostructure. For example, as shown in FIG. 4, an oriented nanotube array may be prepared by a relatively low cost, template-free electrochemical anodization technique. Although the FIG. 4 illustration features a Ti film 402 on a metal substrate 404 as starting materials, the electrodes disclosed herein are not limited to these materials. The substrate may be of any conducting material including, but not limited to, metal, metal oxide, other metallic compounds or other non-metal conductive materials. The film may be of any suitable material, e.g., which may be grown or modified by anodization.

With respect to the specific embodiment of FIG. 4, a Ti film 402 may be anodized in a fluoride-containing electrolyte at a constant or variable anodizing potential. As described in detail below, the morphologies of the resulting nanotube array 406 (for example, the wall thickness, pore diameter and tube length) can be controlled and manipulated by varying the electrochemical and chemical anodization parameters. Variable parameters include, but are not limited to, the anodization voltage, the voltage ramp selected, electrolyte concentration, pH value, and solvent and bath temperature. As described in detail below, oriented $TiO_2$ nanotube arrays, several micrometers in length, with typical wall thicknesses and intertube spacings of 4 nm to 20 nm and pore diameters of about 20 nm to 100 nm have been formed using these techniques. The developed arrays displayed high packing densities of approximately $4 \times 10^{10}$ pores per $cm^2$ and large surface areas of about 65 $m^2/g$. The formed nanotubes are packed in approximately hexagonal array. More precise control of the symmetry of the arrays and the preparation of crack and defect-free arrays may be facilitated by adjusting electrochemical and chemical parameters as discussed above. An imprint method in which the anodized film, for example the Ti film 402 of FIG. 4, is pre-textured with a pattern may be employed to prepare fully symmetric arrays.

A nanotube array, such as the array 406 of FIG. 4, may be subjected to selected post-growth treatments to affect various physical or chemical properties. For example, the anodized array 406 may be annealed at a selected temperature and environment to cause the development of selected crystal phases, crystallite sizes and surface properties. As described in detail below, as-deposited $TiO_2$ nanotubes may be converted from an amorphous phase to a crystalline phase by annealing in moderately elevated temperatures. For example, heating a $TiO_2$ array to 400° C. in air for a few hours produces anatase crystals having a length of more than 50 nm. Heating the amorphous $TiO_2$ material in a moist Ar atmosphere at elevated temperatures transforms the as-deposited $TiO_2$ to a rutile phase with grain sizes of more than 150 nm in length. Annealing films in an oxygen-deficient environment induces the formation of defects which may be primarily located on nanostructured surfaces. Other techniques may be used to achieve other desired parameter changes.

EXAMPLES

The following examples are provided for illustrative purposes only and are not intended to be limiting.

Example 1

Oriented $TiO_2$ Nanotube Array

Oriented $TiO_2$ nanotube (NT) arrays were prepared by electrochemically anodizing 99.7% purity Ti foil having 0.25 mm thickness in a two-electrode cell. The anodizing cell contained a Pt counter electrode and 0.5 wt %, 99.99% purity $NH_4F$ in 99% purity glycerol. The Ti foil was anodized at 20 V for 6 to 46 hours at room temperature to produce NT arrays with lengths varying from 0.6-3.8 μm. After electrochemical anodization, the as-anodized NT films were first cleaned with water, then soaked sequentially in a bath of 20/80, 40/60, 60/40, 80/20, 100/0 vol % ethanol and water for 5 minutes per bath and finally dried using a supercritical $CO_2$ drying apparatus. After the post-growth cleaning and drying treatments, the as-deposited NT arrays were annealed for 1 hour in air at 400° C. with a ramp rate of 2° C./minute. Annealing as described transformed the as-deposited amorphous titanium oxide phase to a crystalline anatase $TiO_2$ phase. The structural properties of the resultant NT films were characterized by scanning electron microscopy and X-ray diffraction.

Figure 5:
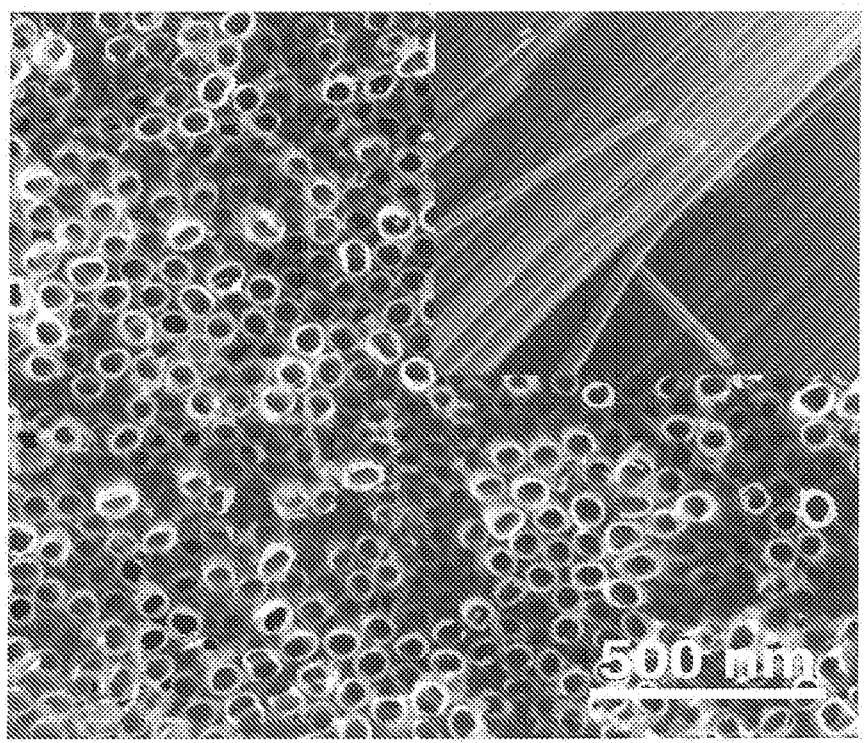
FIG. 5 is a scanning electron microscope (SEM) image of an exemplary oriented array of metal oxide nanotubes.

FIG. 5 shows a typical surface and cross-sectional (inset) SEM image of a $TiO_2$ NT array annealed in air at 400° C. for 1 hour. The individual nanotubes of the array were closely packed in approximately hexagonal symmetry. As described in detail below, the average NT array thickness increased from 0.6 to 3.8 μm with the anodization time. Analysis of the FIG. 5 SEM images shows that the respective averages of the NT pore diameters, wall thicknesses, and center-to-center NT distances were 43, 12, and 73 nm. Film porosity of about 55%, inter-tube spacing of about 6 nm, and NT outer wall diameter of about 67 nm may all be estimated from FIG. 5.

An aspect ratio (defined herein as the ratio of the NT length to the NT outer wall diameter) ranged approximately from 10 to 60. XRD measurements indicate that annealing as described herein transforms the as-deposited NT arrays from amorphous materials to polycrystalline anatase $TiO_2$. The average crystallite size was around 30 nm as determined by applying Scherrer equation to the anatase (101) diffraction peak.

Example 2

Oriented $TiO_2$ Nanotube Arrays Formed at Differing Anodization Potentials

Figure 6:
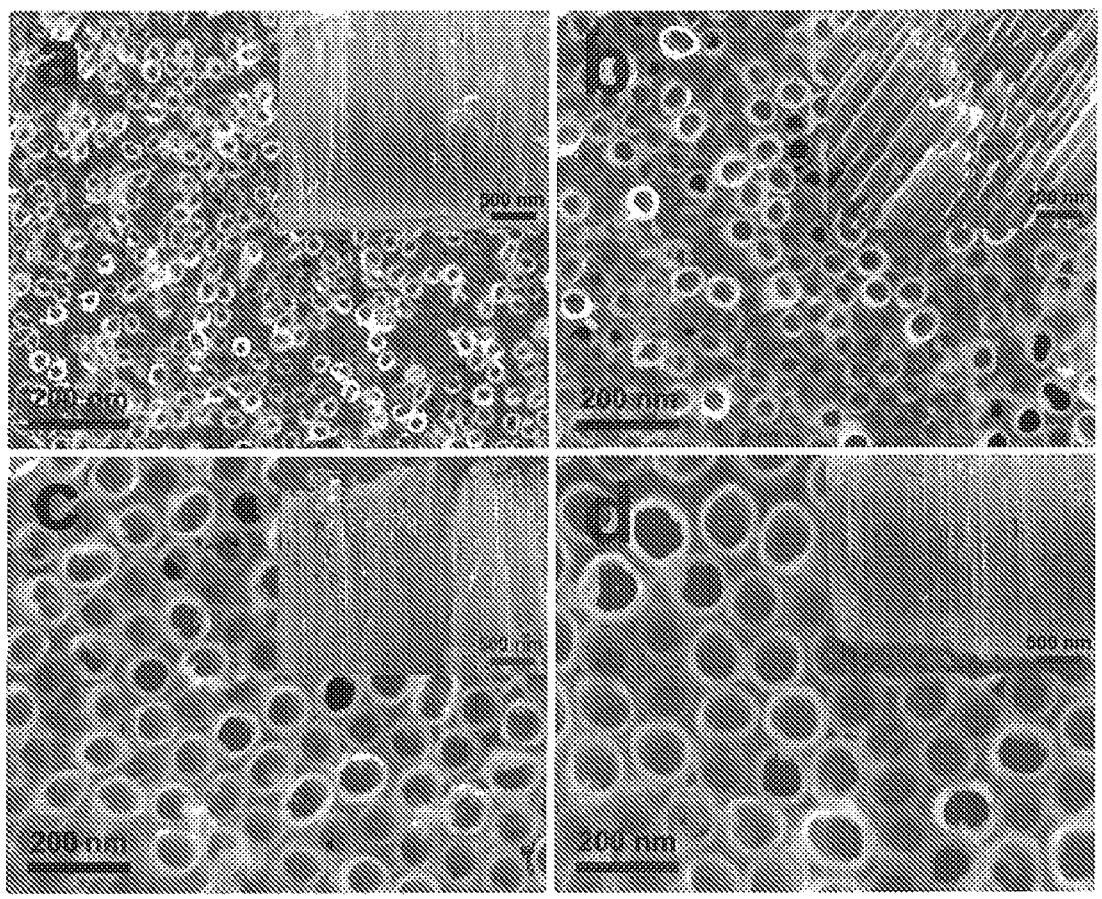
FIG. 6 is four SEM images of exemplary nanotube arrays fabricated at different anodization potentials.

Oriented $TiO_2$ NT arrays with different average pore diameters, wall thicknesses, intertube spacings, and film porosities were prepared by manipulating the anodization and annealing parameters described in Example 1. As illustrated in FIG. 6 and described in Table 1, scanning electron microscopy measurements of selected annealed $TiO_2$ NT arrays showed that the nanostructure parameters (e.g., inner pore diameter and wall thickness) strongly depend on the anodization potential.

TABLE 1

Structural parameters of $TiO_2$ NT arrays anodized at potentials from 10 to 40 V.

| Anodization potential (V) | Pore diameter (nm) | Intertube spacing (nm) | Wall thickness (nm) | Film Porosity (%) | Roughness factor ($\mu m^{-1}$) |
|---|---|---|---|---|---|
| 10 | 21.2 | 4.8 | 9.6 | 47.3 | 109.8 |
| 20 | 50.6 | 5.2 | 12.7 | 55.7 | 69.8 |
| 30 | 73.6 | 9.3 | 14.7 | 62.6 | 50.9 |
| 40 | 96.2 | 8.8 | 17.5 | 63.1 | 42.2 |

As the anodization potential increased from 10 to 40 V, the average pore diameters changed from 21.2 to 96.2 nm; the wall thicknesses varied from 9.6 to 17.5 nm; and the roughness factors (total surface area per volume of film) decreased from 109.8 to 42.2 $\mu m^{-1}$. The individual images of FIG. 6 correspond to the following anodization potentials:

| FIG. 6(a) | 10 V |
| FIG. 6(b) | 20 V |
| FIG. 6(c) | 30 V |
| FIG. 6(d) | 40 V |

Example 3

Electrochemical Characterization of an Oriented Nanotube Array Electrode

The electrochemical characteristics of an electrode fabricated as described in Example 1 in a lithium ion battery was investigated using cyclic voltammetry and galvanostatic charge/discharge cycling. The performance evaluations were conducted at room temperature using a conventional three-electrode glass cell fitted with a potentiostat/galvonostat. The working electrode (anode) was made from annealed $TiO_2$ NTs on Ti foil without extra conducting additives and binders, prepared as described in Example 1. 99.9% purity lithium foil was used as the counter and reference electrodes. The electrolyte was 1M solution of $LiPF_6$ in a 1:1 v/v mixture of ethylene carbonate (EC) and dimethyl carbonate (DMC). The potential window for electrochemical tests was set between 3.0 and 1.4 V vs. $Li/Li^+$. All electrochemical characterizations were conducted in an argon-filled glovebox with moisture and oxygen levels below 0.5 ppm.

Figure 7:
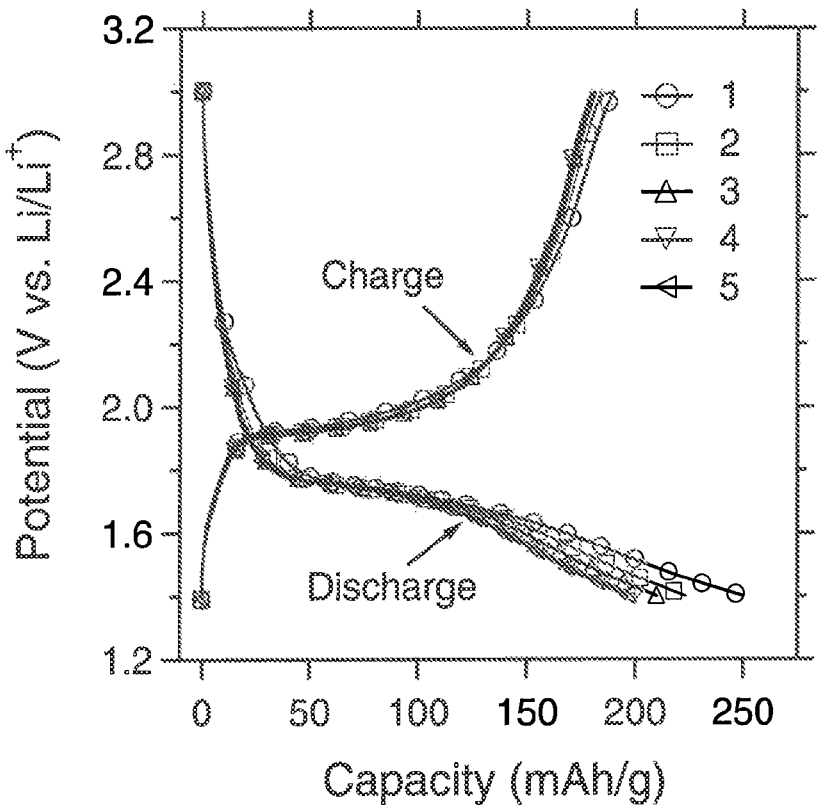
FIG. 7 is a series of charge/discharge curves for an exemplary battery featuring an electrode having an oriented metal oxide nanotube array.

FIG. 7 shows the first five cycles of galvanostatic charge/discharge curves at about 40 mA/g, which is approximately equivalent to a C/4 rate for anatase $TiO_2$ materials, where 1 C is defined as the current required to fully charge or to fully discharge the Li capacity associated with the electrode material in one hour; 1 C≈168 mA/g for anatase $TiO_2$ materials. The discharge curves, corresponding to the $Li^-$ insertion process, can be divided into three consecutive potential regions. The first region, where the potential decreased rapidly and monotonously from 3 to about 1.75 V vs. $Li/Li^+$, corresponds to the broadening of a solid solution domain associated with the initial $Li^+$ insertion process, which leads to the formation of $Li_xTiO_2$ with x up to 0.15. In the second region, the potential of the $TiO_2$ electrode reaches approximately a plateau at about 1.75 V vs. $Li/Li^+$. The potential plateau signifies the biphasic region (i.e., coexistence of $TiO_2$ and $Li_{0.5}TiO_2$), which is typical for Li insertion into anatase $TiO_2$ electrodes. However, there is a significant decline of potential as the capacity increases across this second potential region, which contrasts to the usually observed flat potential plateau for an anatase $TiO_2$ electrode. This result is partially associated with a pseudocapacitive $Li^+$ storage effect. The third potential region from 1.75 to 1.4 V vs. $Li/Li^+$ displays a long sloped capacity-dependent potential profile, which is typical for capacitive behavior.

Similarly, the charge curves can also be divided into three consecutive potential regions, corresponding to the reverse processes (i.e., $Li^+$ extraction) of the three regions of the discharge curves. The plateau potential during the $Li^+$ extraction (charge) process is reached at about 1.95 V vs. $Li/Li^+$, which is typical for Li extraction from anatase $TiO_2$ electrodes.

Figure 8:
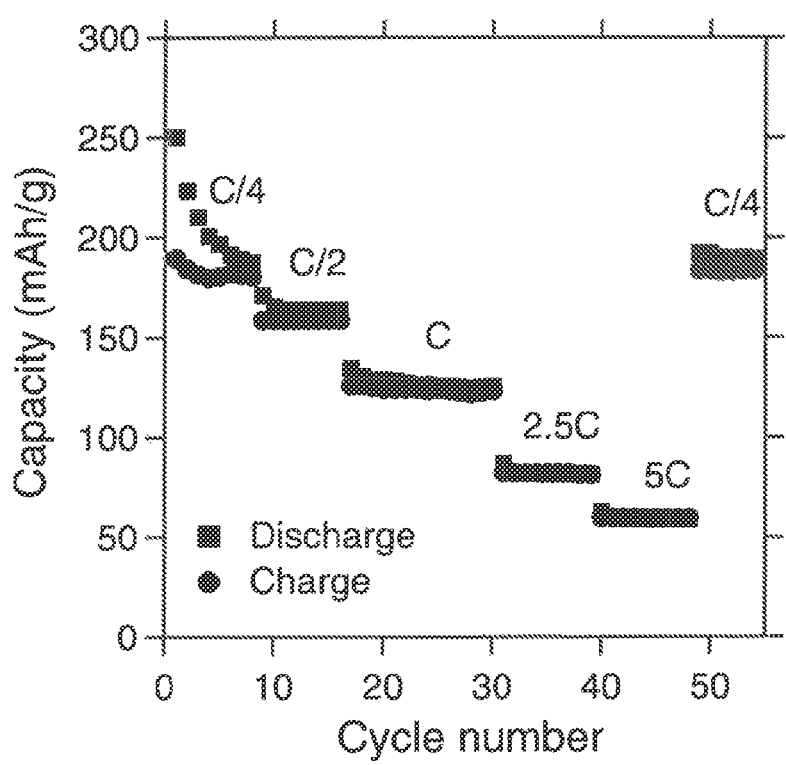
FIG. 8 is a graph showing the cycling performance of an exemplary battery having an electrode featuring an oriented metal oxide nanotube array.

FIG. 8 shows the typical galvanostatic cycling performance of an annealed $TiO_2$ NT electrode at different C rates. The average film thickness of the tested $TiO_2$ NT electrode was about 1.7 μm. The initial discharge and charge capacities were around 250 and 190 mAh/g, respectively. There is a significant irreversible capacity loss during the initial several cycles, especially for the initial discharge curve at the C/4 rate. The irreversible capacity loss may be attributed to the trapping of $Li^+$ at defect sites of anatase nanostructures and/or the irreversible reaction of $Li^+$ with adsorbed water molecules. The specific capacities for both discharge and charge processes were stabilized after a few cycles. The coulombic efficiency at the fifth charge/discharge cycle increased approximately from 92% at C/4 rate to >99% at rates greater than 1 C. The coulombic efficiency and capacity retention on cycling indicate that $TiO_2$ NT arrays prepared as described in Examples 1 and 2 are mechanically stable for accommodating structural changes during the repeated $Li^+$ insertion and extraction processes. No morphological changes of the NT arrays were observed even after >50 charge/discharge cycles, confirming that the described electrodes are structurally stable for $Li^+$ storage and have good cycling stability.

Figure 9:
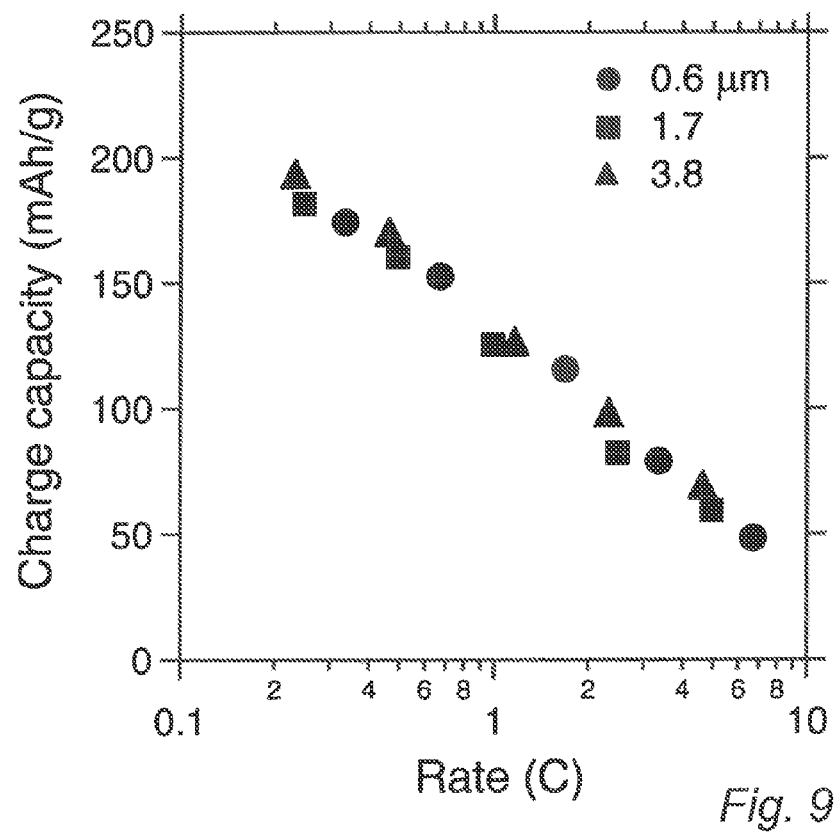
FIG. 9 is a graph showing the effect of nanotube thickness on the charge capacity of an exemplary oriented metal oxide nanotube electrode as a function of cycling rates.

FIG. 9 shows the rate capability of the reversible (charge) capacity for annealed $TiO_2$ NT electrodes prepared as described in Examples 1 and 2 having different average film thickness ranging from 0.6 μm to 3.8 μm. The capacity values were extracted from the fifth charge/discharge cycle at each rate. For a given C rate, there is essentially no difference in the capacity among NT electrodes with different film thicknesses, suggesting that the $Li^+$ insertion/extraction processes occur homogeneously across the entire length of NT arrays. The reversible capacities of NT electrodes for all thicknesses followed virtually the same cycling rate dependence, changing approximately from 190 to 50 mAh/g, as the cycling rate was increased from 0.2 C to 7 C. In general, the decrease of $Li^+$ storage capacities with increasing C rates is attributable to the kinetic limitations inherent in one or more of the four basic steps associated with $Li^+$ insertion/extraction: (i) electron transport within the electrode material, (ii) ion diffusion in the electrolyte, (iii) charge transfer at the electrode/electrolyte interface, and (iv) solid-state $Li^+$ diffusion in the electrode material. The observed lack of the thickness dependence of the reversible capacity of $TiO_2$ NT electrodes implies is that electron transport across the NT electrode is not the rate-limiting step of the $Li^+$ insertion/extraction processes even when no extra conducting additives (e.g., carbon black) are used. This observation also indicates that ion conduction within the pores or between the tubes of NT arrays is fast enough when compared to the charge/discharge rate used in this study. It was also determined that the potential plateau values of charge/discharge curves during the second potential region (see FIG. 7) were the same for NT electrodes with different film thicknesses at similar charge/discharge rates also suggesting that electron conduction within NTs and ion conduction in the electrolyte in the pores do not cause significant hindering of the charge/discharge kinetics.

Figure 10:
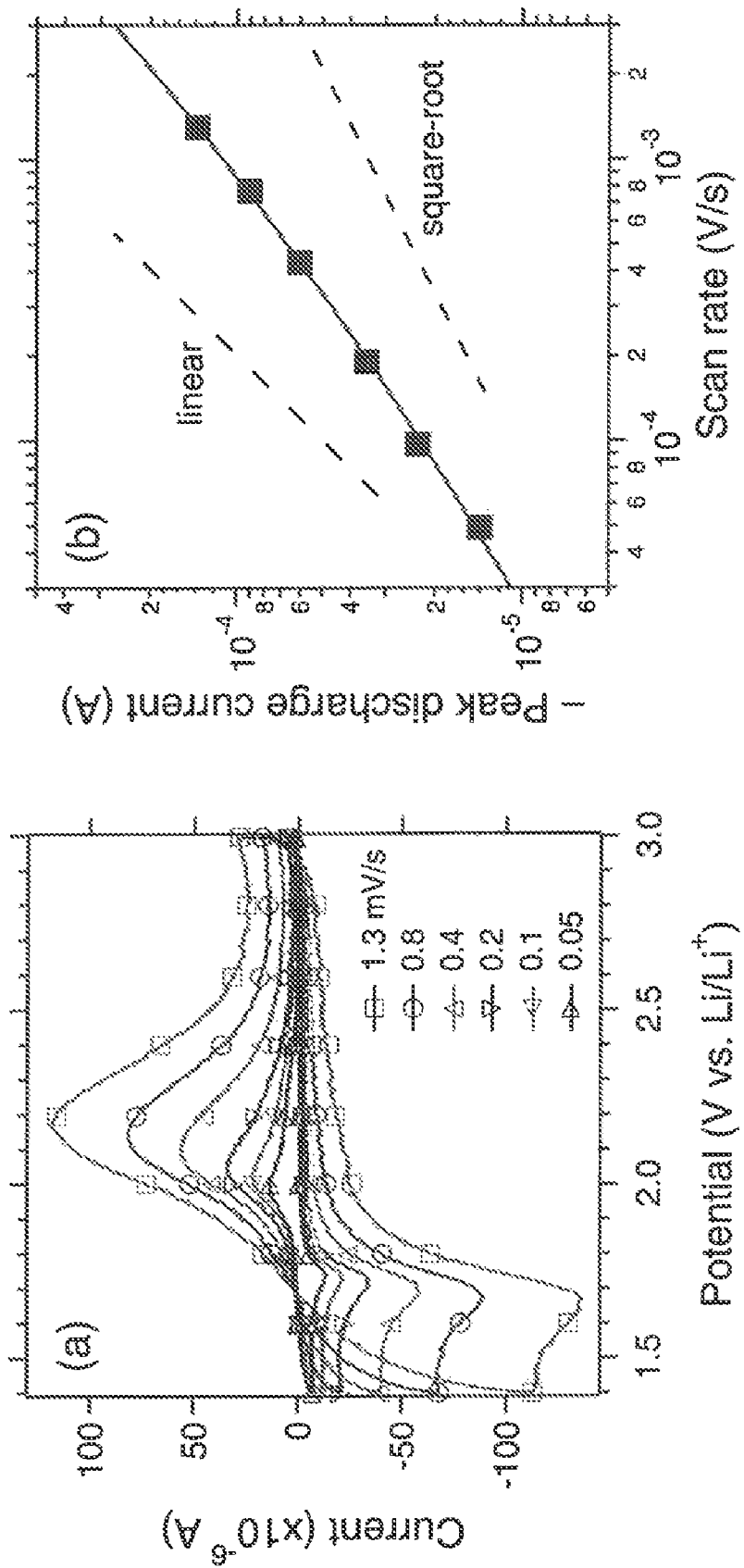

FIG. 10a displays typical cyclic voltammograms (CV) of an annealed $TiO_2$ NT electrode prepared as described in Examples 1 and 2 at scan rates ranging from 0.05 to 1.3 mV/s. The CV curve at the slowest scan rate (0.05 mV/s) shows a pair of cathodic/anodic peaks at approximately 1.75 and 1.95 V vs. $Li/Li^+$, which correspond to the characteristic $Li^+$ insertion/extraction potentials for anatase $TiO_2$ materials. The positions of the cathodic/anodic peaks agree well with the discharge/charge potential plateaus of galvanostatic measurements (See FIG. 7). The intensities of both cathodic and anodic currents increased significantly at higher scan rates over the entire potential window. FIG. 10b shows the dependence of the peak value of the cathodic (discharge; $Li^+$ insertion) current on the scan rate. Similar scan-rate dependence is observed for the anodic (charge; $Li^+$ extraction) current.

Example 4

Electrochemical Characterization of Oriented $TiO_2$ Nanotube Arrays Having Different Physical Parameters As described above in Example 2, the nanostructure parameters (e.g., pore diameter and wall thickness) of electrodes having annealed $TiO_2$ NT arrays strongly depend upon the anodization potential selected during electrode fabrication. Cyclic voltammograms (CV) of various $TiO_2$ NT electrodes prepared as described in Example 2 are presented in FIG. 11. The illustrated CV curves display a pair of cathodic and anodic peaks at, respectively, about 1.70 and 2.05 V vs. $Li/Li^+$, which are in agreement with the values reported for anatase $TiO_2$ materials. As the anodization potential decreased from 40 to 10 V, the cathodic and anodic peaks became narrower, implying faster $Li^+$ insertion and extraction processes.

Figure 12:
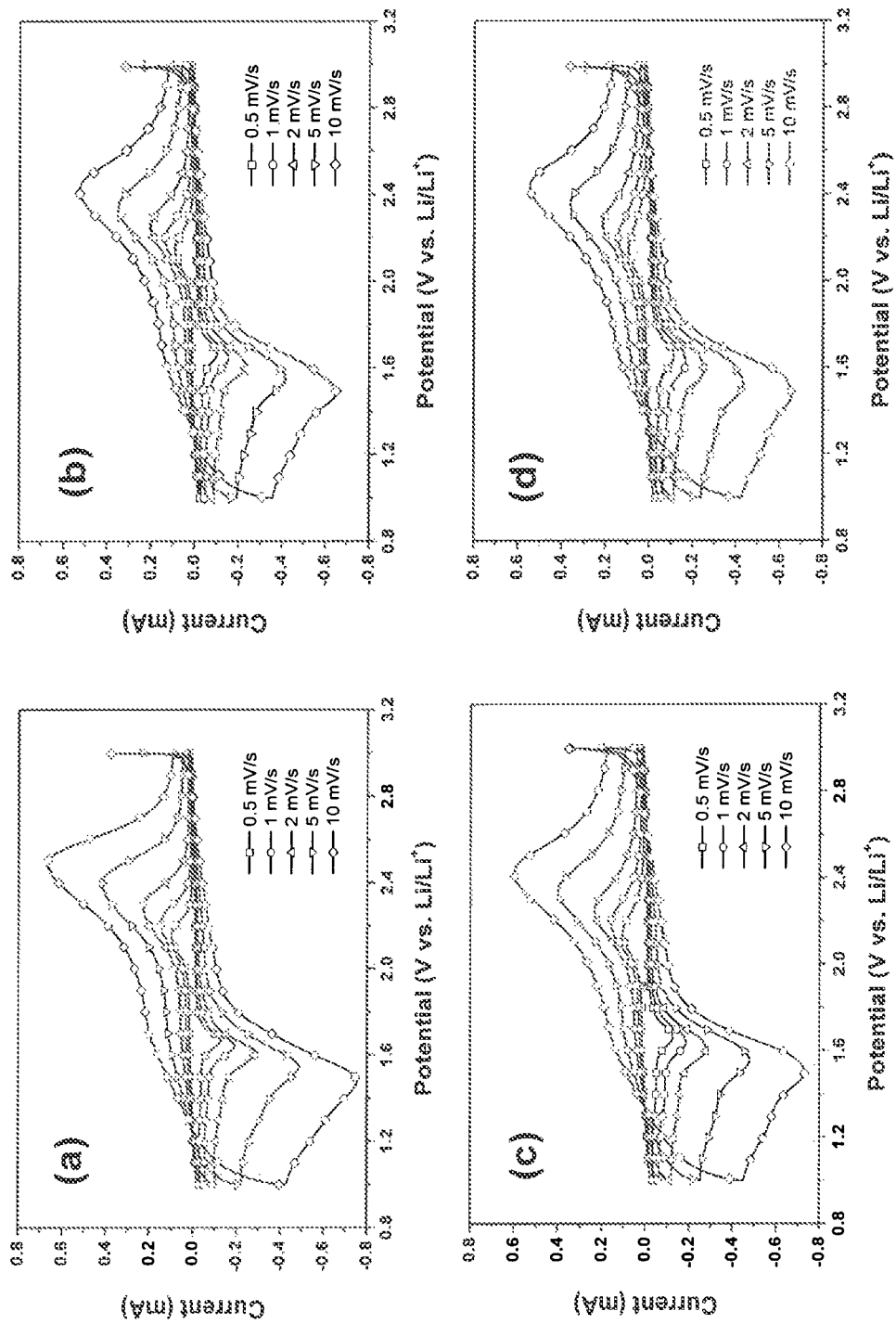
FIG. 12 illustrates cyclic voltammograms of exemplary Li ion batteries prepared with electrodes having metal oxide nanotube arrays fabricated at different anodization potentials.

FIG. 12 illustrates cyclic voltammograms of the four $TiO_2$ NT electrodes of Example 2 at scan rates of 0.5 mV/s, 1 mV/s, 2 mV/s, 5 mV/s and 10 mV/s. FIG. 12a corresponds to the array of FIG. 6a (10 V); FIG. 12b corresponds to the array of FIG. 6b (20 V); FIG. 12c corresponds to the array of FIG. 6c (30 V); and FIG. 12d corresponds to the array of FIG. 6d (40 V). The peak separation between the cathodic and anodic scans becomes greater at higher scan rates. The peak separation is normally associated with the overpotentials required for the electrochemical charge/discharge reactions. Factors contributing to the overpotentials include (1) the electron transport within the electrode materials; (2) the ion conduction through the electrolyte; (3) the charge transfer at the electrode/electrolyte interface; and (4) the solid-state $Li^+$ diffusion in the bulk crystal lattice. Analysis of the CV curves of FIG. 12 reveals that the peak separation is reduced for NTs anodized at lower potentials e.g. 10 V, suggesting that NT arrays having thinner wall thicknesses and larger surface areas favor faster charge/discharge processes at higher scan rates.

Figure 11:
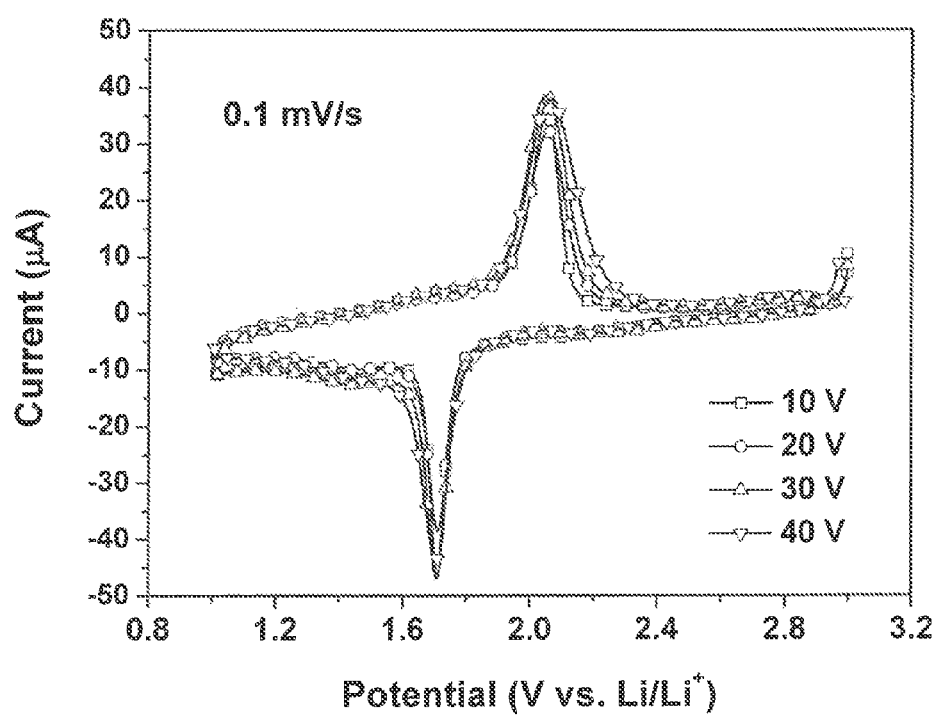
FIG. 11 is a cyclic voltammogram showing the performance of exemplary Li ion batteries having electrodes prepared at different anodization potentials.
Figure 13:
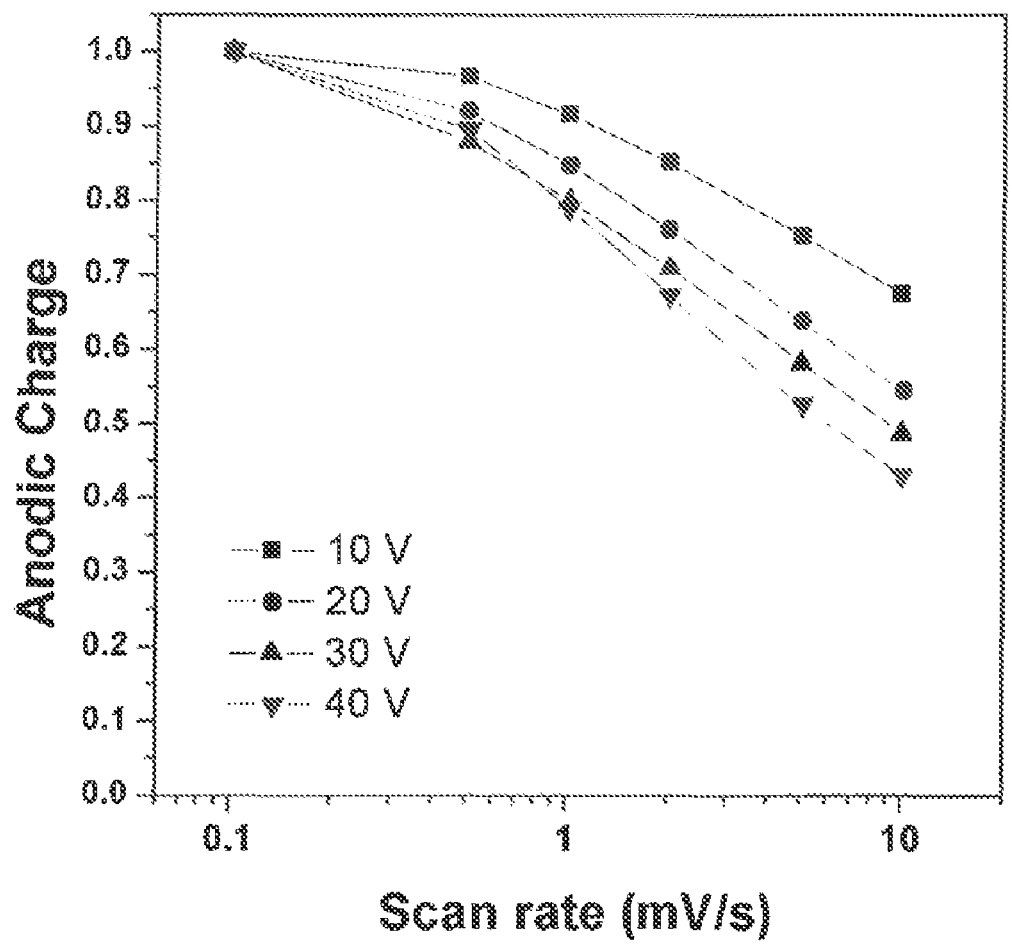
FIG. 13 is a graph showing the integrated voltammetric charge from the Li extraction portion of the cyclic voltammograms of FIG. 12 as a function of scan rate.

The rate capability of the four $TiO_2$ NT electrodes of example 2 may be compared by examining the integrated voltammetric charge based on the CV curves (FIG. 11 and FIG. 12). The integrated voltammetric charge plotted as a function of the scan rate is illustrated in FIG. 13. The anodic charge was normalized with respect to the actual charge of the same electrode measured at the slowest scan rate (i.e., 0.1 mV/s). For the NT electrode anodized at 10 V, the charge retention capacity at the highest scan rate (i.e., 10 mV/s) is about 70% of the capacity at the slowest scan rate (i.e., 0.1 mV/s). In comparison to NTs anodized at 20-40 V, NTs anodized at 10 V have the thinnest wall thickness and the largest surface area (see Table 1 of Example 2 above). The thinner wall thickness is expected to reduce the solid-state Li$^+$ diffusion length, and consequently, result in faster Li insertion and extraction kinetics. The larger surface area should reduce the current density associated with Li insertion/extraction processes, leading to further improvement of the rate capability of NT electrodes. In addition, the pseudo one-dimensional nanotube structure aligned on the current collectors enables fast electron and lithium ion transport. As a result, the fastest observed Li storage kinetics were obtained from the NT electrode anodized at 10 V. It is possible that even lower anodization potential will result in thinner tube walls and faster kinetics.

It may thus be concluded that architectural changes in the NT arrays (e.g., wall thickness and roughness factor) resulting from variations in the electrode preparation conditions (e.g., anodization potential) strongly affect the electrode properties (e.g., Li$^+$ insertion/extraction kinetics). Cyclic voltammetric studies revealed that NT films anodized at 10 V displayed the fastest Li insertion and Li extraction owing to the facile electrode kinetics associated with the structural changes (for example, thin NT wall). It is expected that the electrode performance of TiO$_2$ NTs could be further improved by optimizing NT structural parameters through further variations of the anodization conditions.

Example 5

Performance Characteristics of an Oriented NT Electrode in a Capacitor

The electrochemical characteristics of an oriented NT electrode fabricated as described in Examples 1 and 2 were also investigated in a supercapacitor implementation. All electrochemical measurements were conducted with a conventional three-electrode glass cell setup that consists of a TiO$_2$ NT working electrode, a platinum foil counter electrode, and an Ag/AgCl reference electrode. Cyclic voltammetry and galvanostatic charge/discharge cycling were carried out using a potentiostat/galvanostat between −0.8 and 0.0 V (vs. Ag/AgCl) in 1 M KOH solution at room temperature. The specific capacitance of the electrode material was calculated with the expression I×Δt/ΔV, where I is the constant discharging current, Δt is the discharging time, and ΔV is the voltage window for the galvanostatic cycling.

Figure 14:
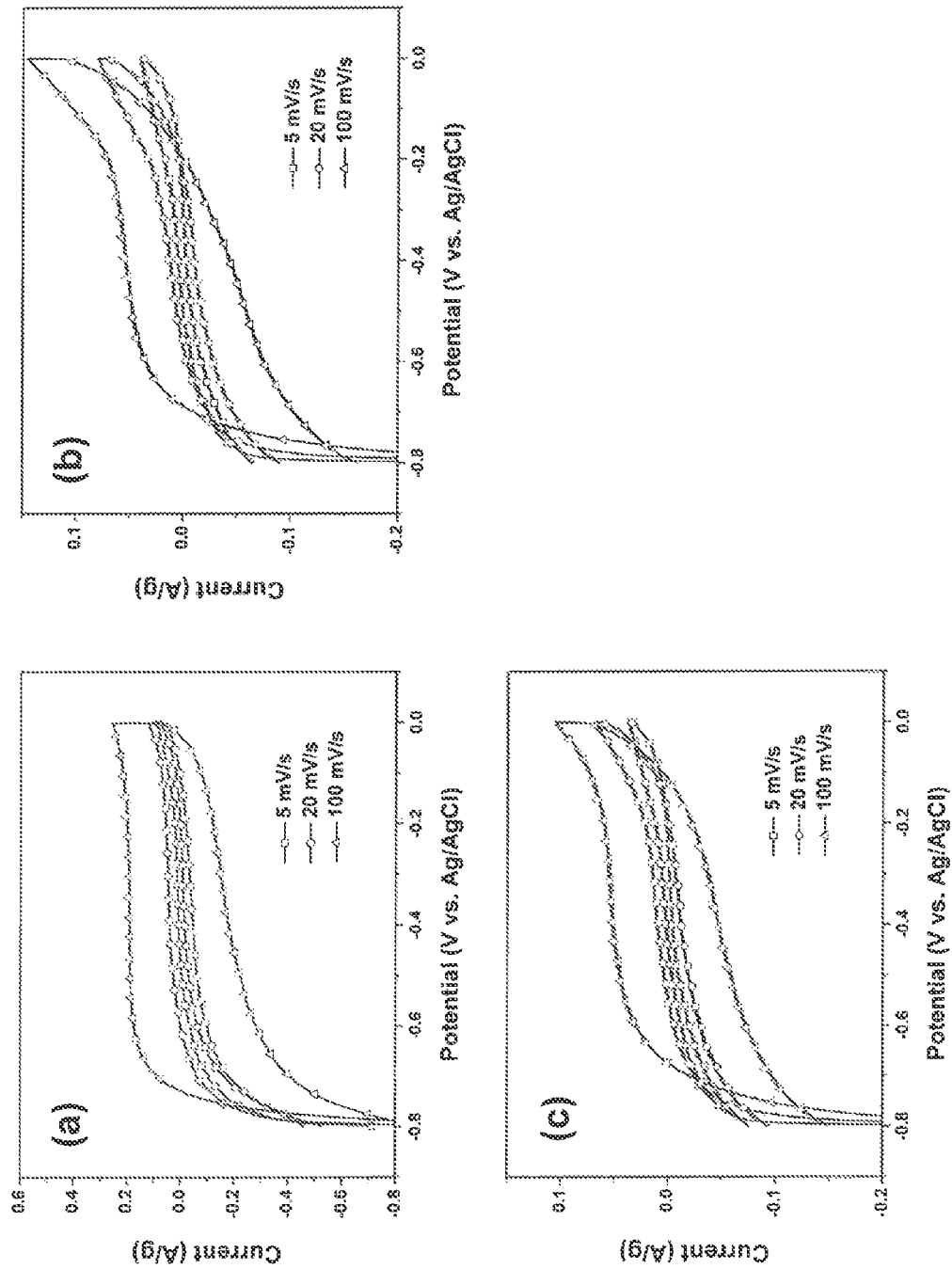
FIG. 14 is cyclic voltammograms of exemplary capacitors prepared with (a) oriented metal oxide nanotube electrode; (b) 20 nm nanoparticle film electrode; and (c) 28 nm nanoparticle film electrode at selected scan rates.

FIG. 14 shows cyclic voltammograms of three TiO$_2$ NT electrode arrays and nanoparticle (NP) films at scan rates of 5-100 mV/s. The shapes of the CV curves are close to the rectangular and symmetric shapes expected for materials displaying capacitive behavior. The capacitance values for NT electrodes prepared as described herein and NP electrodes are compared in Table 2. FIG. 14a illustrates the performance of an oriented TiO$_2$ nanotube electrode. FIG. 14b illustrates the performance of a 20 nm NP film electrode. FIG. 14c illustrates the performance of a 28 nm NP electrode.

TABLE 2

Comparison of the capacitance for the TiO$_2$ NT and NP electrodes at different scan rates.

|  | 5 mV/s | 20 mV/s | 100 mV/s |
| --- | --- | --- | --- |
| NT | 2.3 | 2.2 | 1.9 |
| NP (20 nm) | 1.4 | 0.79 | 0.56 |
| NP (28 nm) | 0.78 | 0.61 | 0.53 |

As the scan rate increased, the NT electrode shows relatively better capacitance retention as well as higher capacitance values. The better capacitive performance of NT arrays may possibly be attributed to the oriented pseudo one-dimensional NT architecture that facilitates faster access of electrons and ions to the electrode-electrolyte interface.

The description has been presented for purposes of illustration and description, but is not intended to be exhaustive or limiting to the form disclosed. The scope is limited only by the following claims. Many modifications and variations will be apparent to those of ordinary skill in the art after becoming familiar with the teachings herein. The embodiment described and shown in the figures was chosen and described in order to explain the principles of the invention, the practical application, and to enable others of ordinary skill in the art to understand the invention for various embodiments with various modifications as are suited to the particular use contemplated.

The invention claimed is:

1. A battery or supercapacitor device comprising:
   a first electrode comprising an oriented array of multiple metal oxide nanotubes, wherein individual nanotubes comprise a substantially lengthwise inner pore that extends at least partially through the length of the nanotube and wherein individual nanotubes are associated at a first end with a current collecting substrate, and wherein individual nanotubes are oriented substantially normal to the current collecting substrate, and wherein the spacing between adjacent nanotubes is about 6 nm;
   an electrolyte in electrochemical communication with the first electrode; and
   a second electrode in electrochemical communication with the electrolyte.

2. The battery or supercapacitor device of claim 1, wherein the oriented array comprises nanotubes having an inner pore diameter of between about 2 nm and 300 nm.

3. The battery or supercapacitor device of claim 1, wherein the oriented array comprises nanotubes having an outer wall diameter of about 67 nm.

4. The battery or supercapacitor device of claim 1, wherein the oriented array comprises nanotubes having a wall thickness of between about 2 nm and 100 nm.

5. The battery or supercapacitor device of claim 1, wherein the oriented array comprises nanotubes having a length of between about 0.2 μm to 1000 μm.

6. The battery or supercapacitor device of claim 1, wherein the oriented array comprises a material selected from the group of TiO$_2$, Fe$_2$O$_3$, Nb$_2$O$_5$, CoO$_2$, MnO$_2$ and MoO$_3$.

7. The battery or supercapacitor device of claim 6, wherein the oriented array comprises at least one of anatase or rutile crystalline phase TiO$_2$ nanotubes.

8. A method of fabricating a battery or supercapacitor device comprising:
   providing a metal surface; and
   electrochemically anodizing the metal surface to form thereon an array of oriented metal oxide nanotubes having substantially lengthwise pores wherein the nanotubes of the array are associated with the metal surface at one end of each nanotube, and wherein the spacing between adjacent nanotubes is about 6 nm.

9. The method of claim 8, further comprising annealing the array of nanotubes.

10. The method of claim 8, further comprising anodizing the metal surface at an anodization potential of between 10 V and 40 V.

11. The method of claim 8, further comprising anodizing the metal surface for a period of between 6 to 46 hours.

12. The method of claim 9, wherein the array comprises nanotubes having an inner pore diameter of between about 2 nm and 300 nm.

13. The method of claim 9, wherein the array comprises nanotubes having an outer wall diameter of about 67 nm.

14. The method of claim 9, wherein the array comprises nanotubes having a wall thickness of between about 2 nm and 100 nm.

15. The method of claim 9, wherein the array comprises nanotubes having a length of between 0.2 μm to 1000 μm.

16. The method of claim 8, wherein the array comprises a material selected from the group of $TiO_2$, $Fe_2O_3$, $Nb_2O_5$, $CoO_2$, $MnO_2$ and $MoO_3$.

17. The method of claim 16, wherein the array comprises at least one of anatase or rutile crystalline phase $TiO_2$ nanotubes.

* * * * *